3,185,566
METHODS OF OBTAINING BY HEATING
SINTERED METALLIC PIECES
Philippe Galmiche, Paris, France, assignor to Office
National d'Etudes et de Recherches Aeronautiques,
Chatillon-sous-Bagneux, France, a corporation of
France
No Drawing. Filed Apr. 19, 1960, Ser. No. 23,138
Claims priority, application France, July 11, 1952,
631,962, Patent 1,060,225
15 Claims. (Cl. 75—212)

The present invention relates to methods of obtaining by heating sintered metallic pieces from simple or complex powders of metals of the group consisting of iron, steel, cobalt, nickel, chromium, molybdenum, tungsten, aluminium and copper, and alloys of these metals.

The chief object of my invention is to improve the conditions of sintering in methods as above mentioned whereby, for instance, sintering is achieved at substantially lower temperatures than with prior methods, or, if the same temperatures are used, the pieces that are obtained have improved mechanical characteristics.

With this object in view, according to my method, at least the end of the heat sintering treatment is performed in the presence of at least one fluoride. This fluoride may consist of a metal fluoride or of hydrofluoric acid in the vapor state. But, advantageously, it consists of a fluoride of an addition metal, particularly chromium, the treatment being then conducted under conditions, especially of temperature, such that, at the same time as sintering, there is produced a diffusion of said addition metal (chromium) into the sintered piece, whereby the treatment is a combination of sintering and chromizing (or more generally addition metal diffusion).

The method which will be described hereinafter is chiefly concerned with this combination of sintering and chromizing for the production of solid pieces from powders of the above mentioned metals or alloys compressed to the desired shape. The powders used according to my invention may contain, in admixture with the metallic component or components, some amount of refractory substances, such as oxides, and if necessary, binders such as urea. camphor, stearic acid, sodium silicate and even organic halogen derivatives such as polytetrafluoroethylene.

According to a preferred form of my invention, the sintering treatment is carried out in a reducing atmosphere which contains vapors of at least one fluoride, and in particular vapors of hydrofluoric acid.

A reducing atmosphere as above mentioned (i.e., one which contains hydrofluoric acid vapor) is obtained in a very simple manner, in the case where sintering is combined with addition metal diffusion (in particular with chromizing), when this addition metal diffusion is performed in the presence of hydrogen. For instance, if this addition metal diffusion is a chromization, this hydrogen combines with fluorine to form hydrofluoric acid when the chromium fluoride vapors in contact with the piece under treatment are decomposed to produce diffusion of chromium into said piece.

However, an atmosphere as above mentioned, may also be obtained by carrying out the sintering treatment in boxes which contain a substantially non volatile fluoride and which are surrounded by a hydrogen atmosphere, said boxes being but partly gas-tight so as to permit a limited exchange of gases between the inside of the boxes and said hydrogen atmosphere. By describing a substance, in this specification, as being "substantially non volatile," I mean that the volatilization of this substance at the temperature of treatment is small, so that any reaction involving the vapors of this substance must therefore proceed slowly. In these conditions, said substantially non volatile substance is gradually reduced by the limited amount of hydrogen entering the box so as to form the desired limited amount of hydrofluoric acid.

The advantageous effect of an atmosphere as above referred to may be attributed:

(1) to the fact that the powder of the metal to be sintered, which may be slightly oxidized, is efficiently reduced by hydrogen mixed with hydrofluoric acid;

(2) to a transfer of metal which welds the grains together.

Such a combination of sintering and metal diffusion may advantageously be carried out by starting from simple or complex powders of metals such as iron, steel, cobalt, nickel, chromium, molybdenum, tungsten, aluminium and copper, or from alloys of these metals either with or without addition of refractory substances such as oxides.

In order to carry out chromizing, chromium is transported onto the pieces to be treated in the form of a chromium fluoride in vapor phase and the pieces to be treated are surrounded by a reserve of regeneration chromium. The chromium fluoride is evolved from a cementation mixture kept out of contact with the pieces to be treated.

*Example 1*

I have obtained connecting rods by compressing an iron powder the grains of which had an average diameter of 40 microns at 5000 kilograms per square centimeter. Sintering and chromizing (by means of a fluoride) were carried out simultaneously by treatment for one hour and thirty minutes at a temperature of 1120° C., the diffusion layer (which may be made apparent by grinding and nitric acid attack) having a thickness of 0.12 mm. The surface was uniformly bright and resistant to atmospheric corrosion.

*Example 2*

By carrying out the same treatment on pieces having already undergone a presintering treatment of two hours, at the same temperature of 1120° C., it was found that the characteristics of elongation of the piece and its resilience were substantially doubled after the subsequent combined sintering and chromizing treatment.

It was also found that iron in the form of a powder agglomerated under a pressure of 4000 kilograms per square centimeter (the size of the powder grains varying from 80 to 100 microns) sinters in the presence of fluorine containing compounds at 1050° instead of 1150° C.

In the case of carbonyl iron powder, if I perform a treatment which has initially a decarburizing effect, it is possible to obtain a good sintering at temperatures as low as 875–900° C.

I will now give examples relating to the sintering of metals other than iron.

*Example 3*

I form by compression under a pressure of 5000 kg./sq. cm. pieces obtained from nickel powder (powder obtained by decomposition of nickel-carbonyl).

The objects thus formed (for instance bars and plates) are sintered for one hour at a temperature ranging from 1100 to 1120° C. in granulated chromium in the presence of ammonium fluoride (about 0.1%).

I thus obtain pieces having a uniformly bright appearance coated with diffusion layers of chromium, about 0.09 mm. thick.

The pieces are quite plastic in the cold state: their porosity is about 8%. The mechanical resistance to bending stresses in the cold state is above 45 kg./sq. mm.

The pieces are protected against dry oxidizing or combustion gases up to temperatures of 900° C. approximately.

As a modification, a recompression operation under a pressure of 5000 kg./sq. cm. is performed between two sintering and chromizing operations made in the conditions above described. The final porosity of the pieces is then reduced to about 3%. The chromium diffusion layers that are obtained are perfectly continuous and have a thickness of 0.125 mm.

The pieces thus obtained are also highly plastic in the cold state, their mechanical resistance to bending stresses in the cold state reaching about 50 kg./sq. mm.

*Example 4*

The conditions of operation are analogous to those described in the preceding example, but the nickel powder is replaced by cobalt powder.

The thickness of the diffusion layers are respectively 0.08 and 0.11 mm., according to the kind of treatment that is applied.

*Example 5*

Articles which have been shaped by compression of a molybdenum powder under a pressure of 6000 kg./sq. cm. are sintered in granulated chromium in the presence of ammonium fluoride. By heating for two hours at a temperature within the range of 1250–1300° C., I obtain chromium diffusion layers which are practically continuous and have a thickness of about 35 microns. The layers that are obtained are of a uniform brightness, little plastic in the cold state and protect the molybdenum core up to temperatures of 850–900° C. for a very long time (several hundreds of hours).

*Example 6*

The compressed articles described in the preceding example have been preliminarily sintered in pure hydrogen. Sintering is then finished at the same time as the articles are subjected to a chromium and silicon diffusion by heating for three hours at 1175° C. in a mixture containing 35% of chromium powder, 10% of silicon, 54% of alumina or zirconia and 1% of ammonium fluoride.

I thus obtain pieces which are protected by diffusion layers of chromium and silicon. The thickness of these layers is of about 0.12 mm.

These articles are protected against dry oxidizing up to temperatures of more than 1200° C.

I will now describe a complementary feature of my invention, particularly interesting for sintering pieces made of powders which have been preliminarily given the desired shape by compression, this feature being intended to avoid (or at least to limit to admissible values) distortion (deformation, weakening) of pieces in the course of treatment, and of avoiding adhesions which, in this case, are particularly to be feared.

It consists in having said pieces supported, during the treatment, by a mass of material in the form of a powder as fine as possible, account being taken of the necessity of circulating an active chromizing vapor therethrough.

This powder which, of course, must not be of the same metal as that of the piece in treatment, is advantageously constituted by the metal or metals of the active fluoride vapors used for obtaining diffusion of said metal or metals onto the pieces, the size of the metallic particles of this powder being limited by the necessity of avoiding sintering thereof. If the metal to be diffused in the pieces is chromium, the size of the chromium particles must be of at least two or three cubic millimeters if the treatment is carried out at about 1100° C.

According to another feature of my invention, I introduce into a mass to be sintered constituted by at least one metal, called basic metal, a substantially non volatile (as here defined) halide of one or more auxiliary metals preferably chosen among metals capable of giving with the metallic particles of the said mass solid solutions having a melting temperature lower than that of said basic metal or metals. It is also within the scope of this invention that the said auxiliary metal or metals may comprise that the basic metal or metals.

For this purpose, the auxiliary metal or metals, if different from the basic metal or metals, must be capable of giving a diffusion layer on said basic metal particles.

Preferably, the said halide is a fluoride.

The proportion of the addition thus made should range between a value little above zero and a value corresponding to saturation of the solid solution of the auxiliary metal in the basic metal of the piece.

By way of example, it may be considered that, in most cases, the addition of halide will range from 0.1 to 3% by weight of the sintered mass.

Although I may consider the possibility of directly adding the metallic halide to the sintering mass, it seems preferable if the halide is a fluoride to form it in said mass by adding thereto particles of the metal (or metals) of the fluoride (or fluorides) to be formed, hydrofluoric acid vapors being then made to act on the mass to form, with said particles, the desired fluoride or fluorides.

By way of example, and citing every time the auxiliary metals in the order of decreasing interest, it may be indicated that:

When the basic metal (constituting the main element of the piece) is iron, the advantageous auxiliary metals are: nickel, manganese, silicon, added either in the pure state or in the form of alloys and in particular of ferroalloys. Although less advantageous, I may also cite aluminum, chromium, cobalt, titanium, vanadium and zinc;

When the basic metal is chromium, the advantageous auxiliary metals are iron and aluminium;

When the basic metal is molybdenum and/or tungsten, the advantageous auxiliary metals are: chromium, iron, silicon and aluminium;

And when the basic metal is copper, the advantageous auxiliary metals are aluminium and zinc.

Even in the absence of an auxiliary metal distinct from the basic metal, there is found an improvement in sintering in a fluoride containing acid atmosphere (in particular an atmosphere containing hydrofluoric acid).

The present invention is also concerned with improvements in methods for producing sintered articles from one of the metallic materials above referred to, preferably with incorporation of a binder to these powders, in order to permit of obtaining pieces of the desired shape, the pieces thus formed being subjected to a preliminary compression and to a heating in a halogen containing reducing atmosphere (preferably a fluoride containing atmosphere as more particularly described precedingly).

It should be noted that, as some of the binders introduce elements which are noxious from the point of view of chromizing, it is of interest to start the treatment by a presintering, in such manner as to give the piece a higher mechanical resistance, the chromizing treatment taking place before the end of the sintering operation, when the piece has already acquired a substantial mechanical resistance and when the binders have been eliminated. During this preliminary operation, I may also perform simultaneously a decarburizing by means of moist hydrogen or I may add, for the same purpose, compounds such as water or ammonium carbonate. It should be noted that, during the chromizing treatment, which must take place in a halide atmosphere, the piece is still being sintered at the same time as a diffusion alloy is formed on its surface by addition of chromium.

In what follows I designate by the term "presintering" any such preliminary thermal treatment during which an intermetallic diffusion effect is started, in particular between the grains of the basic metal.

It should be pointed out that this presintering operation is necessary in a great number of cases, in order to avoid the formation of blisters on the surface of the sintered articles.

Such blisters are generally produced by the gases resulting from the decomposition of the binder, which gases cannot be evacuated due to the quick formation, on the surface of the piece, of a continuous chromized layer due to an accelerated sintering of the surface portions which are placed in a concentrated atmosphere of chromium halide.

In the case of iron and chromium, a presintering operation is still more necessary.

It is known, as a matter of fact, that at 906° C. iron passes from the alpha state to the gamma state and remains in this gamma state up to 1400° C. This transformation is effected with a reduction of volume. Now, iron in the alpha state sinters much more easily than in the gamma state.

On the other hand, it is known that the addition of chromium in iron prevents the transformation from the alpha state to the gamma state when the percentage of chromium is equal to 13%. It will be understood that, in these conditions, at the surface of the mass of iron powder agglomerated by sintering, the addition of chromium prevents the transformation of iron from the alpha state to the gamma state. Therefore sintering takes place much more quickly at the surface of the piece than in the mass thereof, which gives rise to a continuous and coherent chromized layer as above referred to, which causes the formation of blisters when the binder in the mass produces vapors which are prevented from escaping to the outside.

In the particular case where chromium is transported in the form of chromium halides other than chromium fluoride, the presintering treatment is still more necessary because the halogen acids other than hydrofluoric acids attack, during the heating which precedes chromization proper, the powder to be sintered in a very intensive manner, thus producing volatile halides which, on the one hand add their effects to those of the vapors of organic binders to produce blisters, and on the other hand quickly neutralize the chromizing atmosphere and prevent chromizing from taking place in a satisfactory manner.

The presintering operation which is intended to eliminate the above mentioned drawbacks is preferably performed at a temperature ranging from 400 to 910° C. and, advantageously, constitutes a separate operation which, in particular, takes place in an atmosphere which will be eliminated when the sintering treatment proper will be performed.

The minimum temperature of 400° C. is necessary in order to obtain, after a presintering operation, a sufficient cohesion of the piece to permit of treating it without risk of deformation thereof. It should be noted that this minimum temperature of 400° C. must be complied with even when halide containing atmospheres, and in particular fluoride containing atmospheres, are utilized during the presintering operation.

As for the maximum temperature of 910° C., it must be complied with in order to avoid the transformation of alpha iron into gamma iron, which transformation would cause a contraction of the pieces that would be detrimental thereto.

The duration of the presintering operation may range from ten minutes to two hours.

It should be pointed out that, in these conditions of temperature and duration of treatment, the organic binders that may be present in the pieces under treatment are eliminated at temperatures ranging from 250 to 850° C., according to their nature and also according to the rate of heating up.

The atmosphere in which the presintering operation is conducted is advantageously a halide containing atmosphere and, preferably, a fluoride containing atmosphere. However this atmosphere must be such that, in the conditions of operation, there is practically no formation of diffusion layers on the piece which would tend to form a kind of crust having a detrimental action (formation of blisters at the surface of the piece).

The advantage of fluoride containing atmospheres when the sintered powders consist of iron, nickel or cobalt, is to avoid a deep attack of these metals during the presintering operation, this attack being the more intensive as the pieces are more porous. It is known that iron, nickel and cobalt fluorides are the only halides of these metals which are little volatile.

In order to avoid the formation of a kind of crust on the surface of the pieces, the halides that are chosen will be either hydrogen or ammonium halides, or a halide of the basic metal itself ($FeF_2$ or $FeF_3$ if the powders to be sintered are iron powders). I may possibly use other metal halides to facilitate sintering (chromium or metals forming with the basic metal solid solutions melting at a relatively low temperature) but, in this case, care must be taken not to introduce into the treatment container masses of addition metal which would regenerate the active vapors while accelerating a diffusion which must be limited as much as possible.

Generally, use is made of ammonium halide to which is added a little volatile halide of the basic metal to provide the halide containing atmosphere and to maintain it for the whole of the presintering operation.

On the other hand, advantage is taken of this presintering operation to introduce into the powders to be treated the elements that must act during the subsequent sintering and chromizing treatment.

As above stated, it may be advantageous to incorporate in the powders to be sintered at least one substantially non volatile halide of one or several metals chosen among those which give with the particles of the basic metal solid solutions melting at a temperature lower than that of the basic metal or metals.

It has also been stated that it is preferable to form these halides directly in the mass by incorporating therein the corresponding metal particles.

Now, it has been found that when the sintered article is made of iron powders, it is advantageous to choose, as adjunction element, chromium or chromium halides.

As a matter of fact, a study of the iron-chromium diagram shows that iron passes from the alpha state to the gamma state at a temperature intermediate between 910 and 1400° C. for an alloy containing a very small percentage of chromium, but that this transformation from alpha to gamma state no longer takes place as soon as the percentage of chromium in the alloy exceeds 13%. Thus, when steps are taken to create on the inside of the piece a halide, and especially a fluoride, containing atmosphere, the surface of the grains through which sintering takes place therefore remains in the alpha state, which accelerates the interpenetration which results in sintering. The core of the grains is indeed transformed into gamma iron at the sintering temperature (because it consists of pure iron), but the surface of these grains is made of alpha iron and sintering is accelerated and improved. The layer of ferro-chromium that is formed has, on the other hand, a good ductility and this permits of avoiding any drawback during the passage from the gamma to the alpha state (or the reverse) in the grains.

When the basic metal is iron, I therefore introduce, according to the invention, into the powder to be presintered, either chromium if the presintering operation is carried out in a fluoride containing atmosphere, or a chromium halide with a percentage in weight ranging from 0.1 to 5. I may also add a metal such as zinc, manganese, silicon or a halide of these metals.

It is also preferable, in this case, to have recourse to a fluoride because on the one hand, as above stated, the powder is not attacked, and on the other hand the low volatility of fluorides prevents blisters and cracks which might happen with other halides which may decompose or boil.

Concerning the addition of chromium, the introduction in the form of fluoride seems to be more favorable than its formation in the mass.

From another point of view, it is of interest to perform the presintering operation in conditions such that it permits of obtaining, according to the desired purposes, a decarburizing or a carburizing of the pieces in treatment. If it is desired to obtain a decarburizing, heating must be performed in an atmosphere of air or in an atmosphere containing ammonium carbonate $(NH_4)_2CO_3$ or water vapor or moist hydrogen. On the contrary, if it is desired to obtain a carburizing intended to produce a surface hardening of the pieces by formation of chromium carbide, the presintering operation must take place in a carburizing medium, this medium being obtained in an easy manner by a mixture of carbon and barium carbonate (Caron cement).

The temperature and the duration of the presintering operation may, in combination with the conditions of sintering proper, permit of determining the final porosity of the pieces to be obtained. It is for instance possible to perform different presintering operations while keeping a conventional sintering and chromizing treatment.

According to a further feature of my invention, I perform, after the sintering operation, other treatments which can only be performed in the case of sintered pieces having sufficient compacity.

Thus, for instance, I may in some cases carburize the pieces after sintering in order to obtain hard layers which have a high resistance to wear and tear.

In other cases, relative to sintered and chromized pieces obtained from iron or steel powders, possibly with the addition of copper, the surface of the pieces is made especially hard by performing a nitriding treatment. In this case, the duration of the chromizing treatment is to be limited if the materials are still superficially porous after chromizing, because the nitriding action must not go beyond the chromized layer, in order to avoid scaling.

According to still another feature, which relates more particularly to the case of sintered and chromized iron pieces having, after chromizing, some porosity, the resistance to oxidizing of these pieces is increased by subjecting them, after they have been chromized, to a controlled oxidizing treatment. This treatment may be performed with air, water vapor or industrial hydrogen, either mixed or not with water vapor (industrial hydrogen containing a sufficient amount of oxygen). Chromium, which is very sensitive to oxidizing, then oxidizes while filling the pores at the surface of the piece, but the oxidation does not reach the core of the piece which is thus preserved and does not risk to become brittle.

I will further state that, when it is desired to treat half-sintered iron pieces, it may be advantageous to incorporate copper therein, for instance by impregnating them before the chromizing operation or by mixing copper powder with iron powder. Anyway, this step improves the mechanical characteristics of the pieces.

I will now give examples of presintering operations according to the present invention.

Example 7

This example is concerned with the treatment of toothed wheels made of iron powder to which has been added 3% of copper powder, the grain size of these powders being about 10 microns, the binder consisting of 1% of stearic acid and the preliminary compression of the pieces being of 3000 kg./sq. cm.

These pieces were subjected to a presintering operation during about half an hour at a temperature of 700° C., by heating in relatively gastight boxes heated in air. The boxes contained a mixture of ammonium fluoride and iron fluoride disposed out of contact with the pieces. These pieces were subsequently subjected to a sintering and chromizing treatment for one hour and a half at 1080° C. by making use of a mass of chromium fluoride located out of contact of the pieces, the latter being surrounded by regeneration chromium having a grain size ranging from 2 to 5 mm.

The pieces thus obtained were very bright and practically non porous and free from blisters. They had very regular diffusion layers (0.1 mm. thick) and were perfectly resistant to dry or organic saline oxidizing).

Example 8

I operated in the same conditions as in the preceding example, but the temperature of the presintering operation was only 600° C.

The results obtained were substantially analogous, but the pieces were not quite so bright and, furthermore, they had a higher porosity at the end of the chorimizing treatment.

It should be noted that if the normal sintering of pieces had been started in a hydrogen atmosphere and if the chromizing had been performed for two hours at 1080° C., the porosity of said pieces would have been much higher and their mechanical resistance much lower.

Example 9

This example concerns the treatment of cams made from an iron powder having a grain size of 20 microns, the binder consisting of 1% of stearic acid, the preliminary compression being of 4000 kg./sq. cm.

The presintering step lasted for one hour at 875° C. in a carburizing medium. The pieces were then subjected to the sintering and chromizing operation for two hours at 1025° C., chromium being obtained from a mass of chromium fluoride, as in Example 7, and regeneration chromium in the form of grains being used.

The pieces that were obtained were light grey, very smooth and they were provided with extremely hard and continuous layers of chromium carbide.

Example 10

This example is concerned with the treatment of cams and differs from the preceding ones by the addition, to the iron powder, of 3% of copper powder, said powders having a grain size of about 10 microns and the preliminary compression being about 3000 kg./sq. cm.

The presintering operation lasted for one hour at a temperature of 850° C. and the chromizing operation was performed for two hours and a half at 1080–1100° C., this treatment being followed by a nitriding treatment of one hour at 520° C.

It has been found that the pieces were not porous after sintering and they had, at the end of the nitriding treatment, an extremely hard surface (1500 Vickers).

Example 11

This example is concerned with the treatment of pieces obtained from iron powder having a grain size of 10 microns approximately, the binder consisting of 1% of stearic acid and the preliminary compression being of 3000 kg./sq. cm.

The presintering operation lasted for half an hour at a temperature of 450° C. and the sintering and chromizing operation took place for one hour at 1050° C.

The pieces, at the end of the treatment, were slightly porous and had some corrosion defects. They were subjected to an oxidizing treatment by heating them for fifteen minutes at 750° C. in moist hydrogen at 5% and the pieces, which were then of green color, were then quite insensitive to moist corrosion.

Example 12

This example is concerned with pieces consisting of iron powder of a grain size of 20 microns mixed with 1% of chromium fluoride forming an emulsion in water, the binder consisting of 1% of stearic acid and the preliminary compression being of 4000 kg./sq. cm.

The presintering operation lasted for forty-five minutes at 800° C. and the sintering and chromizing operation for one hour at 1100° C.

The surface of the pieces was identical to that of cast steel and their mechanical resistance at least equal to that obtained with pieces produced by a conventional sintering method with an impregnation of 5% of copper, the characteristics of said pieces being close to those of annealed mild steel.

*Example 13*

The starting material consists of iron powder mixed with 8% of chromium powder, and 3% of chromium fluoride forming an emulsion in water.

The binder was constituted by 1% of camphor and the preliminary compression was 400 kg./sq. cm.

The presintering operation lasted for one hour at 850° C. and the sintering and chromizing operation for two hours at 1120° C.

The pieces thus obtained were nonoxidizable in the mass.

*Example 14*

Sintering and chromizing of iron powder to make electro-magnet cores.

The pieces which have been given the desired shape by compression, under 5 t./cm.$^2$ of an electrolytic iron powder with the addition of 1% of a binder consisting of stearic acid are subjected to a presintering treatment of 30 minutes at a temperature of 650° C. by heating in boxes which are only partly fluidtight in the presence of moist ammonium fluoride.

After this treatment, the pieces thus obtained, which already have a substantially mechanical resistance and are decarburized, are sintered and chromized by heating for 3 hours at 1,075° C. in granulated chromium in the presence of 0.1% of acid ammonium fluoride. I thus obtain pieces having a uniformly bright apearance, plastic in the cold state and well protected against moist corrosion (the thickness of the surface diffusion layer being approximately 0.12 mm.). The magnetic permeability of the pieces is little different from that of pieces made of pure iron and their remanence is very low due to the absence of any residual carbon and to the presence of the surface layer of ferro-chromium.

*Example 15*

The conditions of treatment are the same as in the preceding examples but the pieces, after the presintering treatment, are subjected to a compression under 5,000 kg./sq. cm. The porosity of the core of the pieces thus obtained is lower than 2%.

*Example 16*

The same conditions of treatment as in Examples 14 and 15 are applied to a powder consisting of a mixture of 80% of iron powder and of 20% of nickel powder.

*Example 17*

The conditions are the same as for Examples 14 and 15 but the treatment is applied to a nickel powder (the thickness of the diffusion layer is 0.09 mm.).

*Example 18*

Sintering and chromizing of tungsten.

Articles made of a tungsten powder and having undergone a presintering treatment in hydrogen after a compression under 8,000 kg./sq. cm. are sintered and chromized by heating in granulated chromium in the presence of ammonium fluoride for 1 hour and a half at a temperature of 1,350° C. I thus obtain very regular chromium diffusion layers the thickness of which does not exceed 20 microns.

If the same treatment is performed with a tungsten powder having undergone a compression of 5,000 kg./sq. cm. and which has not undergone a preliminary presintering treatment, the diffusion layers obtained with the same sintering and chromizing treatment have a thickness of 80 microns (due to the penetration of the chromium fluoride vapors into the mass of powder) but they are relatively brittle.

*Example 19*

The treatment is the same as in Example 18, but 2% of silicon is added to the chromium powder.

The thickness of the diffusion layer of silicon and chromium reaches 0.08 mm.

*Example 20*

Sintering and chromizing of cobalt powder.

Flat bars are obtained by compression under 7,000 kg./sq. cm. of a cobalt powder of very great fineness (10 microns of diameter approximately) to which 1% of camphor has been added.

The pieces are subjected to a presintering treatment of 1 hour in the presence of ammonium fluoride and ammonium carbonate, after which they are sintered and chromized in two successive steps of 1 hour at a temperature of 1,175–1,200° C. in granulated chromium in the presence of ammonium fluoride (0.1%). I thus obtain pieces having a uniformly bright appearance, plastic in the cold state and having a diffusion surface layer of 0.18 mm. The pieces are protected against dry oxidizing and thermal shocks up to about 850–900° C.

*Example 21*

The conditions of treatment are the same as in Example 20 but a recompression operation is effected between the two successive chromizing steps. The thickness of the diffusion layers is reduced to 0.15 mm.

*Example 22*

Sintering and chromizing of molybdenum with a presintering step.

Molybdenum bars obtained by compression under 6,000 kg./sq. cm. are subjected to a presintering operation in moist hydrogen (heating in partly gastight boxes in the presence of a mixture of ammonium fluoride and ammonium carbonate). The presintered pieces are then sintered in two successive steps, each for 1 hour at 1,800–1,850° C. I thus obtain uniformly bright pieces having protective chromium diffusion layers of a thickness of 40 microns.

*Example 23*

According to a modification of Example 22, the pieces instead of being chromized are coated with chromium and silicon by heating in a mixture containing 30% of chromium powder, 5% of silicon powder, 2% of ammonium fluoride and zirconia (the remainder).

The diffusion layers that are obtained have a thickness of about 120 microns for the same conditions of temperature and duration.

The present application is a continuation-in-part application of my co-pending application Ser. No. 367,286, filed on July 10, 1953.

What I claim is:

1. In a method of sintering a primary metal powder selected from the group consisting of iron, steel, cobalt, nickel, molybdenum, tungsten, aluminum and copper, the improvement comprising effecting at least a portion of said sintering in the presence of hydrofluoric acid vapors, hydrogen and chromium fluoride vapors, under conditions to produce chromium diffusion into the grain surface of said powder.

2. The method of claim 1 wherein said primary metal powder is shaped before said sintering and supported during said sintering by a vapor permeable mass of granular chromium.

3. The method of claim 1 wherein said sintering is effected in a container and said hydrofluoric acid is formed by placing a substantially non-volatile fluoride in said metal powder and adding a limited amount of hydrogen to the atmosphere in said container whereby said hydrofluoric acid is formed by the reaction of said substantially non-volatile fluoride with said hydrogen.

4. The method of claim 1 wherein a substantially non-volatile auxiliary metal halide is present with said metal powder, the metal of said auxiliary metal halide being selected from those capable of forming with said primary metal powder a solid solution melting at a temperature below the melting point of said primary metal.

5. The method of claim 4 wherein said halide is a fluoride and is formed in situ from said hydrofluoric acid and particles of said auxiliary metal.

6. The method of claim 1 wherein said chromium fluoride is introduced in the solid state.

7. The method of sintering a primary metal powder selected from the group consisting of iron, steel, cobalt, nickel, molybdenum, tungsten, aluminum and copper, comprising shaping said primary powder into a piece, preheating said piece under conditions that prevent substantial sintering while increasing cohesion thereof, and sintering said piece in the presence of hydrofluoric acid vapors, hydrogen and chromium fluoride vapors under conditions to produce chromium diffusion into the grain surface of said powder.

8. The method of claim 7 wherein said preheating is performed in the presence of hydrofluoric acid vapors, hydrogen, and metal halide vapors under conditions that no substantial metal diffusion occurs into said primary metal.

9. The method of claim 8 wherein said metal halide is mixed as a solid with said primary metal powder.

10. The method of claim 8 wherein said metal halide is a halide of the primary metal.

11. The method of claim 8 wherein said preheating is carried out at a temperature below that of the subsequent sintering step.

12. The method of claim 11 wherein said primary metal is iron, said metal halide is a chromium halide and said preheating is conducted from ten minutes to two hours at a temperature from 400° C. to 910° C.

13. The method of claim 8 wherein said halide is a fluoride.

14. The method of claim 13 wherein said primary metal contains carbon, is selected from the group consisting of iron and steel, and is decarburized during said preheating.

15. The method of claim 13 wherein said primary metal is selected from the group consisting of iron and steel, and said preheating is performed in a carburizing medium.

References Cited by the Examiner

UNITED STATES PATENTS

| 2,656,595 | 10/53 | Stern et al. | 75—224 |
| 2,657,127 | 10/53 | Sindeband et al. | 75—224 |
| 2,874,070 | 2/59 | Galmiche | 117—130 |
| 2,875,112 | 2/59 | Becket et al. | 117—130 |

FOREIGN PATENTS 1,060,225   11/53   France.

CARL D. QUARFORTH, *Primary Examiner.*

OSCAR R. VERTIZ, ROGER L. CAMPBELL, *Examiners.*